April 20, 1943.  A. S. VOLPIN  2,317,122

PUMP PISTON

Filed June 11, 1942

Inventor
ALEXANDER S. VOLPIN.

Lester B. Clark.

By

Attorney

Patented Apr. 20, 1943

2,317,122

UNITED STATES PATENT OFFICE 2,317,122

PUMP PISTON

Alexander S. Volpin, Houston, Tex.

Application June 11, 1942, Serial No. 446,571

9 Claims. (Cl. 309—4)

The invention relates to a pump piston, particularly that type of piston used in the slush pumps for circulating heavy abrasive viscous drilling fluid into and out of a well bore.

A piston of this sort is subjected to alternate compression and suction pressures so that the sealing material is under tremendous strain in actual operation.

It is therefore necessary to firmly support and reinforce the flexible sealing material on the one hand and to make such sealing members readily removable from the piston body so that they can be replaced or repaired if desired.

It is therefore one of the objects of the invention to provide a simple and economical support to be embedded in a seal ring of a pump piston.

Still another object of the invention is to provide a pump piston packing member having a dished face exposed to the pressure and a dished reinforcing member cooperating therewith to retain the packing member in working position.

Another object of the invention is to provide a dished reinforcing member for pump piston rubbers which is exposed at the inner area of the piston rubber so as to provide a base for anchorage of the rubber.

Another object of the invention is to provide a removable and replaceable piston rubber in which the supporting and reinforcing member is embedded therein.

Still another object of the invention is to provide a snap ring for pump piston rubbers which can be readily removable and inserted.

Other and further objects of the invention will be readily apparent when the following description is considered in connection with the accompanying drawing wherein.

Figure 1:
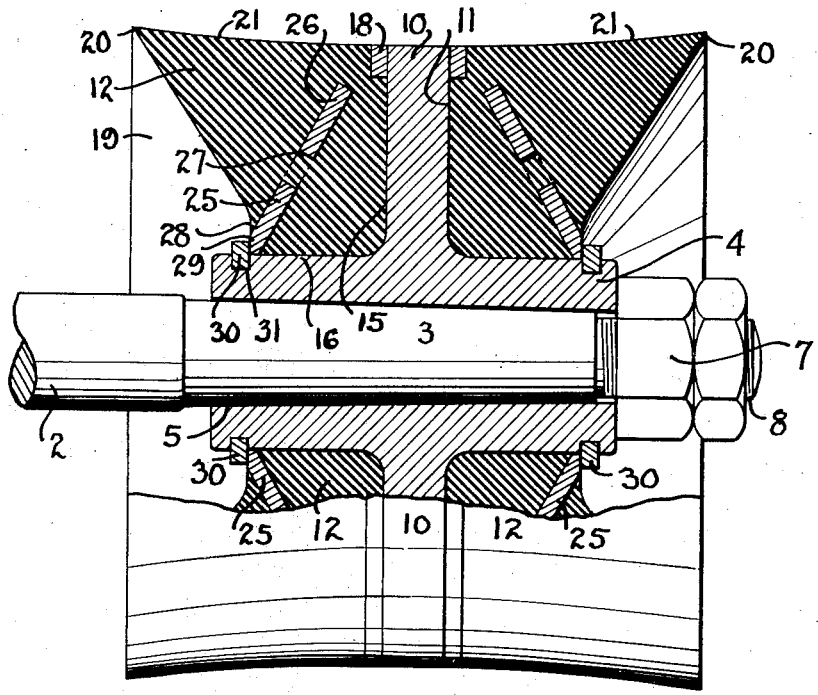
Fig. 1 is a side elevation with most of the piston shown in section.

Fig. 1 shows the pump rod 2 which usually has a tapered area 3 thereon to receive a piston body 4. This body 4 has an internal tapered bore 5 which corresponds to the taper 3 on the rod so that the body may be slipped over the rod to the position of Fig. 1 and there firmly anchored by drawing up the nuts 7 which fit over the threaded end 8 of the rod. In this manner the piston body 4 is firmly anchored for movement with the rod.

The body 4 is of substantially cylindrical outer dimensions and has an outstanding rigid flange 10 thereon. This flange in turn has the flat edge faces 11 which are to form a seat for the piston rubbers of sealing members 12. Each sealing member is of a particular construction having a face 15 which is arranged to seat upon the flange 11 and an inner periphery 16 which is arranged to seat on the surface of the hub or body 4. This rubber or member 12 may have a retaining or reenforcing band 18 adjacent its periphery which seats against the flange 10. The outer end 19 of the rubber is dished so as to provide a sealing lip 20. The outer periphery 21 is slightly flared so that it will be compressed by the pump liner in such a manner that the inherent resiliency of the rubber or other material will perfect a seal with the liner. In a piston of this type which is reciprocated to and fro in the pump liner, there is a tremendous pressure on the dished face 19 on the compression stroke, which tends to force the lip 20 and periphery 21 against the inside of the pump liner so that the material of the piston is thus placed under compression.

On the return stroke there is considerable suction created in the pump chamber by the movement of the piston and the tendency is to pull the rubber from the body and flange so that the packing rubber must be firmly anchored to the pump body and held against loosening so as to prevent abrasives or other materials from entering between the rubber and the flange and the body.

Figure 2:
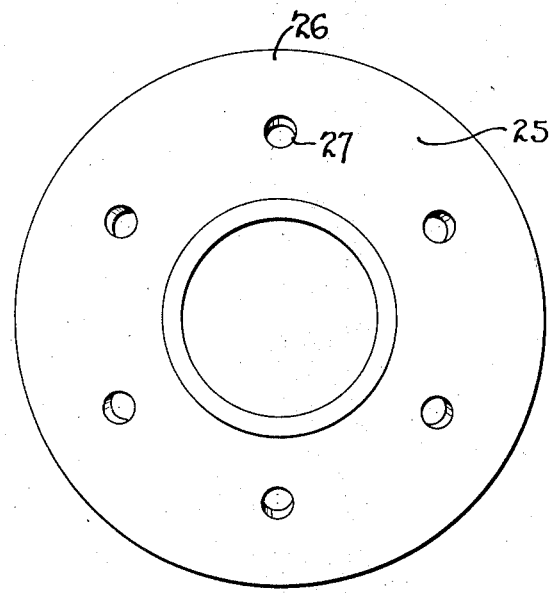
Fig. 2 is a plan view of the reinforcing plate.

With the foregoing in mind, the packing rubbers 12 have each been provided with a combination reinforcing and anchoring disc or plate 25. This plate is best seen in Fig. 2 and is dished or frusto conical in configuration with the smaller portion of the plate extending outwardly and the larger portion 26 extending inwardly, so that it is arranged substantially diagonal of the packing rubber as seen in section in Fig. 1. A plurality of openings 27 may be provided so as to obtain a firm anchorage with the rubber. This arrangement of the plate gives a substantial reinforcing across the diagonal of the rubber, leaving the lip portion 20 and a substantial amount of the rubber material free to flex under the suction and compression of the working stroke.

The inclination of the plate toward the center provides a gradation in the amount of rubber available for flexibility so that the stresses along the periphery may be equalized and the amount of movement is inversely proportional to the amount of material. In other words, a wider base along the inclined face of the plate is provided for the triangle of rubber which is seen in section.

This plate 25 also serves as an anchor for the rubber packing in that it projects into the flattened base area 28 at the base of the dished face 19 and is exposed at 29 for contact with the locking or snap ring 30 disposed in a groove 31 in the periphery of the body 4. In this manner when the snap ring is in place the packing ring will be properly anchored and to replace the ring it is only necessary to remove the snap ring, make the replacement and reinsert the snap ring.

The plate 25 abuts both the snap ring and the body and resists both axial and radial stresses and tends to prevent undue distortion of the flexible material.

Attention is directed to the fact that the base portion 28 has a sufficient flattened area to permit an outward radial movement of the snap ring in removing it and inserting it relative to the piston body.

Figure 3:
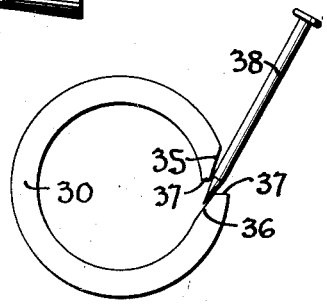
Figs. 3 and 4 are plan and side views of the snap ring.
Figure 4:
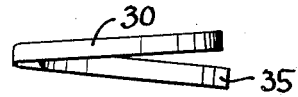

Figs. 3 and 4 show the peculiar configuration of the snap ring in that it has the complementary faces 35 and 36 on opposite ends thereof with the end portions 37 cut away so as to permit the insertion of a nail or other instrument 38, tending to serve as a lever to pry the end portions apart and allow the inherent spring qualities of the ring to cause it to snap out of the groove 31 to facilitate its removal.

It is believed that a simple and economical piston and sealing ring construction has been devised and that the invention broadly contemplates a combination reenforcing and anchor plate embedded in the sealing member.

What is claimed is:

1. A pump piston including a body to receive the pump rod, an outstanding flange on said body, a flexible sealing member on each end of said body and abutting said flange, means to hold each of said members in position including a reenforcing and retainer plate of frusto conical configuration embedded in each of said members and having its inner surface facing said flange, said plate extending to the end area of the member, and a lock ring to clamp said plate and the resilient material thereon to said body and against said flange.

2. A pump piston including a body, a flange thereon, a resilient sealing member on the body on each side of the flange, a combination retainer and reenforcing plate embedded in the material, said plate being dished with its dished surface toward said flange so as to provide a freely flexible lip, and means to lock the plate to said body.

3. A packing ring for pump piston comprising an annulus of resilient material, a lip on one edge thereof, said annulus being polygonal in cross section, a reenforcing and retainer plate embedded therein and extending substantially diagonally of the cross section of the annulus, the sides of said lip constituting the sides of a triangle whose base lies parallel to said retainer plate.

4. A pump piston including a body, a packing ring thereon having a dished end, a flattened annular portion at the base of the dished end, a reenforcing and retainer plate embedded in the ring and merging into such base, and a locking means carried by said body and against which said plate abuts to retain said ring on said body.

5. In a slush pump piston, a body having an annular groove therein, a packing member, a circular lock ring having inner and outer peripheries and adapted to enter said groove to retain said member, and beveled ends on said ring to facilitate its removal from said groove, one of said ends having an inwardly beveled surface from the outer peripheral surface of the ring and the other of said ends having an outwardly beveled surface from the inner periphery of the ring whereby a prying tool may be inserted between said ends to lift the latter from within said groove.

6. A packing ring for pistons including an annulus of resilient material, a cylindrical bore therein, a flat end face, a dished end face, and a dished reenforcing and retainer plate embedded in said annulus with its apex merging with the dished end.

7. A pump piston comprising a packing and a metal body having an outwardly extending packing supporting flange, a metal band interposed between said flange and packing and extending downwardly from the periphery thereof, a dished retainer plate moulded substantially within said ring and disposed so that the dished side of said plate faces said flange and means to hold said packing in working position on said body.

8. A packing for cylindrical pump pistons, said packing having a back portion and a forward end, a metal band moulded to said back portion, a dished metal plate moulded substantially within said packing and disposed so that the dished side of said plate faces said ring.

9. A packing ring for pistons including an annulus of resilient material, a cylindrical bore therein, a flat end face, a dished end face, and a dished reenforcing and retainer plate embedded in said annulus with its apex merging with the dished end, said material having a lip portion formed as a triangle in cross section whose base is along the retainer plate and whose sides are the dished end and periphery respectively whereby the amount of material available for flexibility is inversely proportional to the amount of movement due to stress.

ALEXANDER S. VOLPIN.